A. J. BARACREE.
STORAGE BATTERY.
APPLICATION FILED MAR. 24, 1919.

1,381,959. Patented June 21, 1921.

Inventor.
A. J. BARACREE.
By
Attorneys

UNITED STATES PATENT OFFICE.

ARTHUR J. BARACREE, OF CHICAGO, ILLINOIS.

STORAGE BATTERY.

1,381,959.  Specification of Letters Patent.  Patented June 21, 1921.

Application filed March 24, 1919. Serial No. 284,521.

*To all whom it may concern:*

Be it known that I, ARTHUR J. BARACREE, a citizen of the United States, residing at Chicago, in the county of Cook and State of Illinois, have invented new and useful Improvements in Storage Batteries, of which the following is a specification.

This invention relates to storage batteries, and more particularly to the supporting means of the battery plates, the invention having for its object to provide a very simple and highly efficient means engageable with the ends of the plates and constructed to securely hold the same properly spaced in the battery jar or container.

The object stated is attained by means of a novel combination and arrangement of parts to be hereinafter described and claimed, and in order that the same may be better understood, reference is had to the accompanying drawing, forming a part of this specification.

Figure 1:
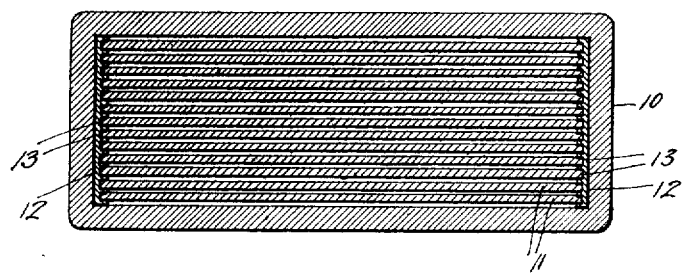
Figure 1 is a horizontal section showing the application of the invention.
Figure 2:
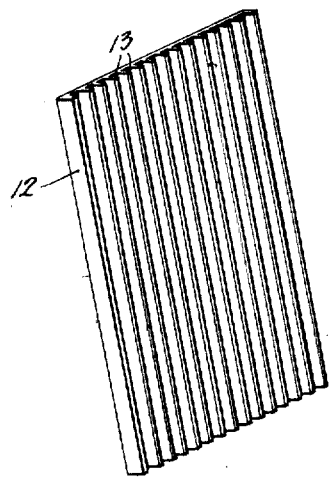
Fig. 2 is a perspective view of one of the supporting devices.

Referring specifically to the drawing, 10 denotes the outer jar or container of the battery in which the usual plates 11 are mounted. At opposite ends of the container are positioned supports for the ends of the plates. These supports comprise plates 12 of hard rubber, celluloid or other material impervious to the electrolyte, and they are plain on one side to snugly fit the end walls of the jar, whereas their opposite sides or outer faces are made with parallel, and spaced vertical grooves 13. The grooves of the respective supporting plates face each other and they are also in alinement. It will therefore be seen that if the battery plates 11 are inserted between the plates 12 so that each one of the former seats at its ends in opposite grooves 13, all the battery plates will be securely supported and held in proper laterally spaced relation. This arrangement is clearly illustrated in Fig. 1. It will be noted that the supporting plates 12 seat snugly between the opposite side walls of the container 10, and as they also seat against the end walls, and are held against inward displacement when the battery plates are in place, the latter are securely supported even after the insulation used therebetween has disintegrated.

The supporting plates 12 will also absolutely prevent the possibility of short circuits due to buckling of the battery plates caused by heavy discharges, and each battery plate is rigidly held in place and is allowed to perform its natural functions as long as there is any active material left in the grids.

The supporting plates 12 also facilitate repairs as they are not permanently fastened in the container 10, but are removable, this enabling the repairman to remove the element from the cell in one complete unit without "soaking" or "heating" the container.

Figures 3, 5:
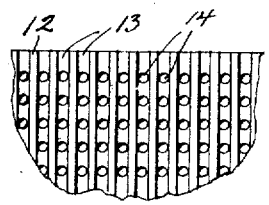
Fig. 3 is an elevation of a fragment of one of the supporting devices.

The plates 12 have perforations 14 as shown in Fig. 3 to provide for circulation of the electrolyte, thereby reducing to a minimum any heat which might be developed by crowding the cell.

The plates 12 also insures the manufacturer against damage from careless workmanship in assembling the cells, as each element must be fitted into the plates, and there is only one way they can be fitted, and that being the simplest way. The invention therefore results in a uniformity of construction which is greatly desired in storage battery production.

I claim:

1. In a storage battery, means for supporting the plates in spaced relation, said means comprising members having spaced parallel grooves in which the ends of the plates seat, said grooved portions having perforations.

2. In a storage battery, means for supporting the plates in spaced relation, said means comprising plates removably seating against the end walls of the container and between the side walls thereof, and having spaced parallel grooves in their outer faces in which the ends of the battery plates seat, said grooved portions having perforations.

In testimony whereof I affix my signature.

ARTHUR J. BARACREE.